United States Patent
Scanteianu

(10) Patent No.: US 8,931,786 B1
(45) Date of Patent: Jan. 13, 2015

(54) SNOW VEHICLE WITH REMOTE CONTROL CAPABILITIES

(71) Applicant: Daniel Miron Scanteianu, Ossining, NY (US)

(72) Inventor: Daniel Miron Scanteianu, Ossining, NY (US)

( * ) Notice: Subject to any disclaimer, the term of this patent is extended or adjusted under 35 U.S.C. 154(b) by 0 days.

(21) Appl. No.: 14/266,804

(22) Filed: Apr. 30, 2014

(51) Int. Cl.
*B62B 13/08* (2006.01)
*B62B 13/14* (2006.01)
*B62B 13/10* (2006.01)
*B62B 13/12* (2006.01)

(52) U.S. Cl.
CPC .............. *B62B 13/14* (2013.01); *B62B 13/10* (2013.01); *B62B 13/12* (2013.01)
USPC ........................................... 280/21.1; 280/16

(58) Field of Classification Search
USPC ....................... 280/15, 16, 17, 21.1
See application file for complete search history.

(56) References Cited

U.S. PATENT DOCUMENTS

| | | | | |
|---|---|---|---|---|
| 3,682,495 A * | 8/1972 | Zaimi | ............................ | 180/190 |
| 4,219,207 A * | 8/1980 | Muir et al. | ..................... | 280/22.1 |
| 4,334,691 A * | 6/1982 | Scheib | ...................... | 280/14.1 |
| 4,796,902 A * | 1/1989 | Capra | ............................ | 280/16 |
| 5,823,546 A * | 10/1998 | White | ......................... | 280/22.1 |
| 6,234,262 B1 * | 5/2001 | Moore | .......................... | 180/182 |
| 6,241,265 B1 * | 6/2001 | Kovar et al. | ..................... | 280/16 |
| 6,279,925 B1 * | 8/2001 | Miller | .......................... | 280/22.1 |
| 6,530,582 B2 * | 3/2003 | Dempster | .................... | 280/22.1 |
| 7,090,227 B2 * | 8/2006 | Morin | .......................... | 280/14.1 |
| 7,249,647 B2 * | 7/2007 | Nietlispach | .................. | 180/190 |
| 7,762,564 B2 * | 7/2010 | Stene-Johansen et al. | ..... | 280/16 |

* cited by examiner

*Primary Examiner* — Jeffrey J Restifo

(57) ABSTRACT

A snow vehicle propelled by gravitation has a frame supported by four posts attached to four skis. The two rear skis are attached to the supporting posts using hinges with one degree of liberty. The two front skis are rigidly attached to the support posts and the posts are attached to the frame at a 45 degree angle using hinges with two degrees of liberty. Two linear actuators are attached to the frame and to the rear of the front skis using hinges with two degrees of liberty. The actuators are remotely controlled by a human using an on board computerized steering/braking controller that works in such a manner as to replicate the human wedge style of skiing (a.k.a. plow skiing).

1 Claim, 17 Drawing Sheets

SNOW VEHICLE WITH REMOTE CONTROL CAPABILITIES

CROSS-REFERENCE TO RELATED APPLICATIONS

This application is a continuation of U.S. Provisional Pat. Appl. No. 61/819,009, filed 2012 May 3, from which priority is claimed under 35 USC 119(e). All said patent documents are incorporated herein in full by reference.

STATEMENT REGARDING FEDERALLY SPONSORED RESEARCH OR DEVELOPMENT

Not Applicable

BACKGROUND

The present invention relates to Class D12, Transportation, Subclass 6, Sled. The present invention relates to various systems used for steering and speed control of snow vehicles.

The control of the direction of movement of a snow vehicle is usually obtained by either changing the position of the front ski of a vehicle using a total of two or three skis (one front ski used for steering/support and one or two rear skis used only for support on the snow) or by changing the direction of the two front skis of a vehicle using three or four skis (two front skis used for steering/support and one or two rear skis used only for support on the snow). In the case of a powered snow vehicle like a snowmobile, the rear support is replaced by a powered endless track.

Vehicles using a single front ski for steering must use different means for braking or must rely on the ability of the operator to stop by turning the vehicle perpendicular to the initial direction of motion. The U.S. Pat. No. 8,523,195 describes a snow vehicle that employs braking members that are lowered to contact the snow, so as to create friction or resistance with respect to the snow on the ground. The disadvantage of the method is that the steering ability is substantially reduced during braking due to the increased friction from the braking members. By contrast, the U.S. Pat. No. 5,863,051 describes a snow vehicle that has no braking provisions.

Vehicles using two front skis for steering usually turn both skis in the same direction for steering and they are facing the same problem as the single front ski vehicles when they need to brake. The U.S. Pat. No. 8,590,654 B2 describes a snowmobile that uses the endless track for braking by decupling it from the motor and locking it. To avoid skidding, an antilock braking system (ABS) can be used.

Vehicles using two front skis for steering could use the wedge technique (plow skiing) for speed control and steering, as described in U.S. Pat. No. 3,682,495. In this embodiment, the operator's ability to control the front skis will determine the precision of the steering and the efficiency of the braking.

SUMMARY OF THE INVENTION

This invention presents a new method for controlling the angle between the snow and the front skis, used for steering and braking. Also, this invention describes a new approach to control the steering and braking of a snow vehicle using a computer assisted servo mechanism that can be easily controlled via a joystick, making it usable by persons with disabilities. The joystick could use a wireless connection to the computer, allowing the vehicle to be remotely controlled, for example by a ski patroller using the vehicle to transport an injured skier. This snow vehicle could steer while braking using the wedge technique (plow skiing) even on steep slopes, permitting its usage as transport vehicle for materials or personnel.

In one embodiment, a vehicle is provided comprising a frame, a plurality of ground engaging members including two front ground engaging members supporting the front portion of the frame and one or more rear ground engaging members supporting the rear portion of the frame. A steering/braking assembly consisting of two linear actuators operatively coupled to the two front ground engaging members is used to orient one or both front ground engaging members. The front ground engaging members are rotatable relative to the frame about a first set of axes that are parallel to each other and angled back at 45 degrees relative to the frame and also are rotatable about a second set of axes that are perpendicular to the first set of axes. An electronics unit controls the steering/braking assembly according to the commands issued by a human operator or by an autonomous navigation system. The vehicle is gravity propelled.

In another embodiment, a vehicle is provided comprising a frame, a plurality of ground engaging members including two front ground engaging members supporting a front portion of the frame and one or more rear ground engaging members supporting the rear portion of the frame. A power train system is supported by the frame and operatively coupled to at least one of the plurality of the rear ground engaging members. A steering/braking assembly consisting of two linear actuators is operatively coupled to the two front ground engaging members to orient one or both front ground engaging members. The front ground engaging members are rotatable relative to the frame about axes that are parallel to each other and angled back at 45 degrees relative to the frame. An electronics unit controls the steering/braking assembly according to the commands issued by a human operator or by an autonomous navigation system. The vehicle could be gravity propelled when going down the slopes or power train propelled on flat terrain or uphill.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a snow vehicle, it should be understood that the features disclosed herein may have application to other types of vehicles.

Figure 1:
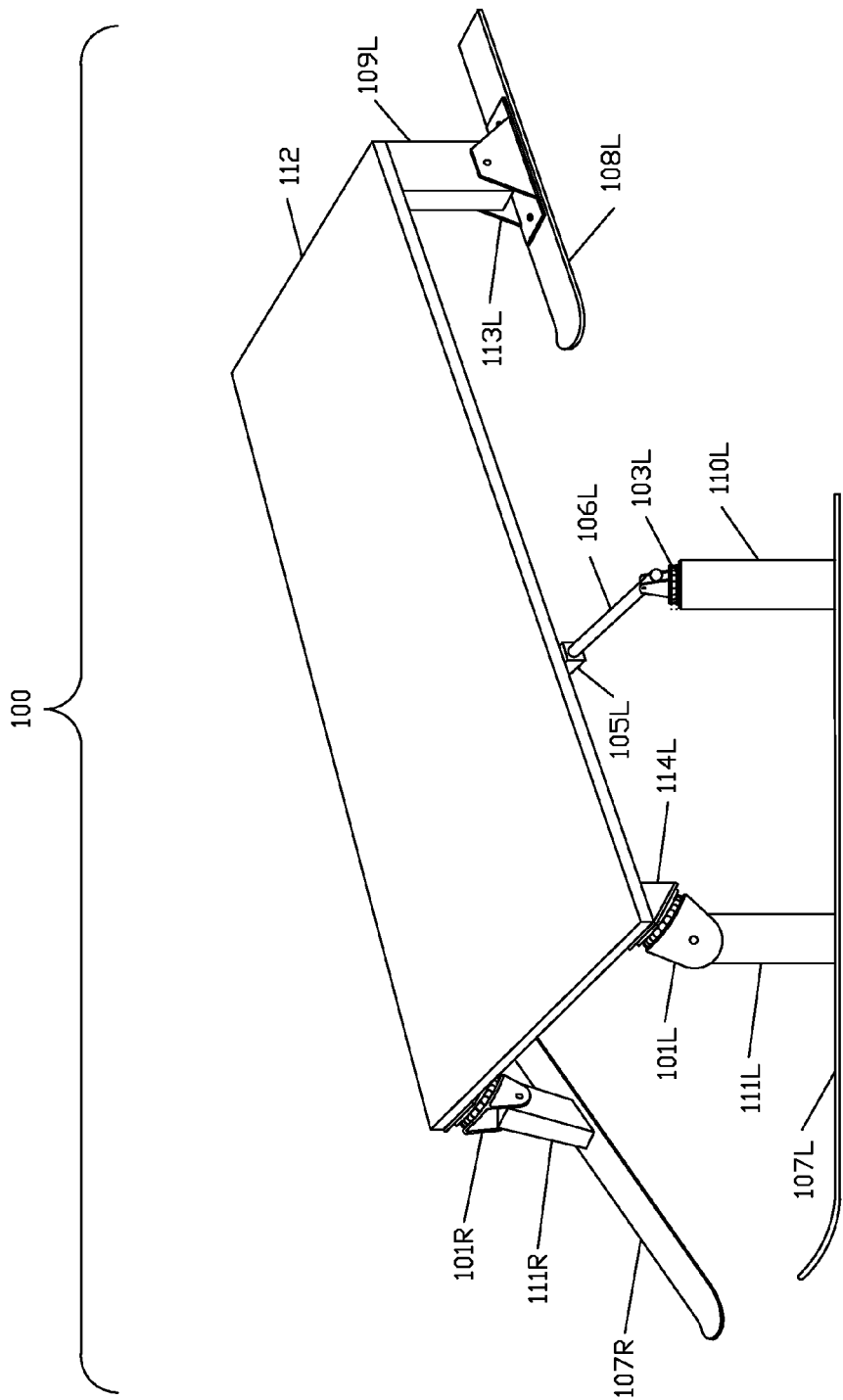
FIG. 1 illustrates a front, left, perspective view of an exemplary snow vehicle

Referring to FIG. 1, an illustrated embodiment of vehicle 100 is shown. Vehicle 100 as illustrated includes a plurality of ground engaging members: a pair of front skis 107L and 107R supporting the front portion of the vehicle, and a pair of rear skis 108L (and 108R, not visible) supporting the rear portion of the vehicle. Further, front skis 107L and 107R are rigidly coupled to posts 110L and 111L and respectively 110R (and 111R, not visible). Upper end of the posts 111L and 111R are coupled to blocks 114L (and 114R, not visible) by means of hinges 101L and 101R. Blocks 114L (and 114R, not visible) are rigidly attached to the frame 112. Upper end of posts 110L (and 110R, not visible) are attached to the end of the rods 106L (and 106R, not visible) of the actuators 105L (and 105R, not visible) by means of the hinges 103L (and 103R, not visible). Actuators 105L (and 105R, not visible) are attached to the frame 112 (by means of hinges 102L and 102R, not visible). Rear skis 108L (and 108R, not visible) are coupled to posts 109L (and 109R, not visible) by means of the hinges 113L (and 113R, not visible). Upper ends of the posts 109L (and 109R, not visible) are rigidly attached to the frame 112.

Figure 2:
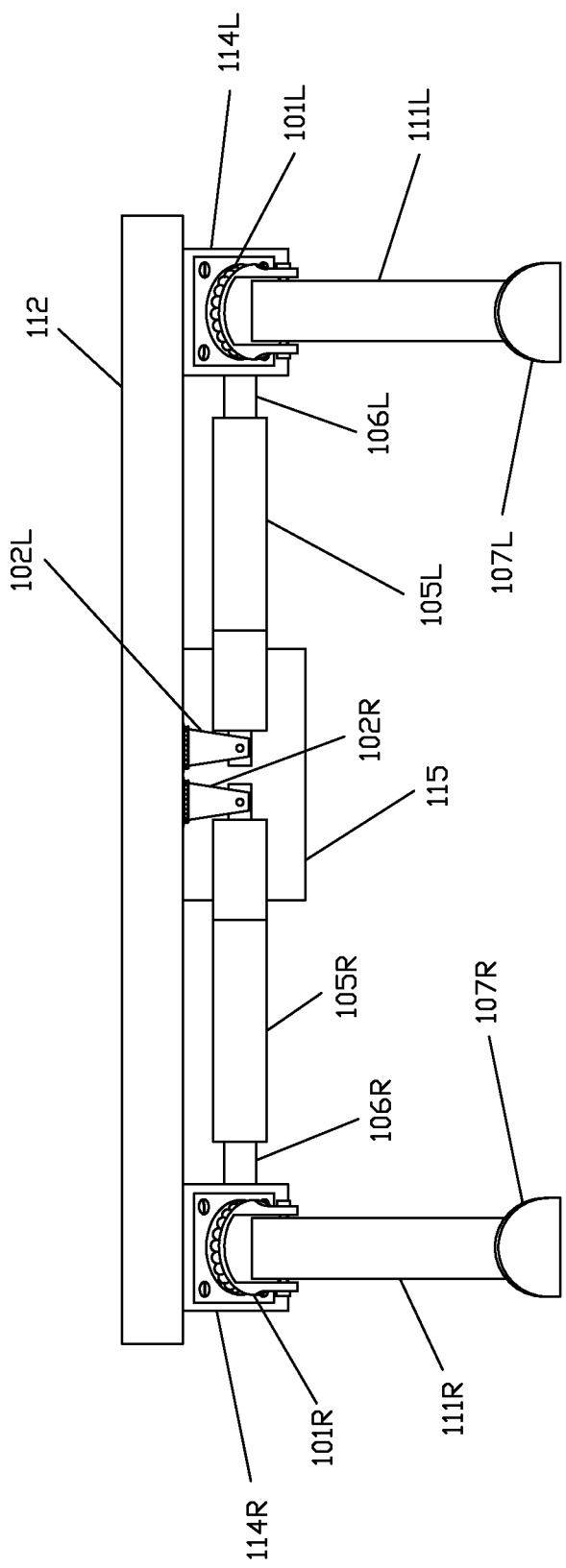
FIG. 2 illustrates a front elevation view of the exemplary vehicle of FIG. 1
Figure 3:
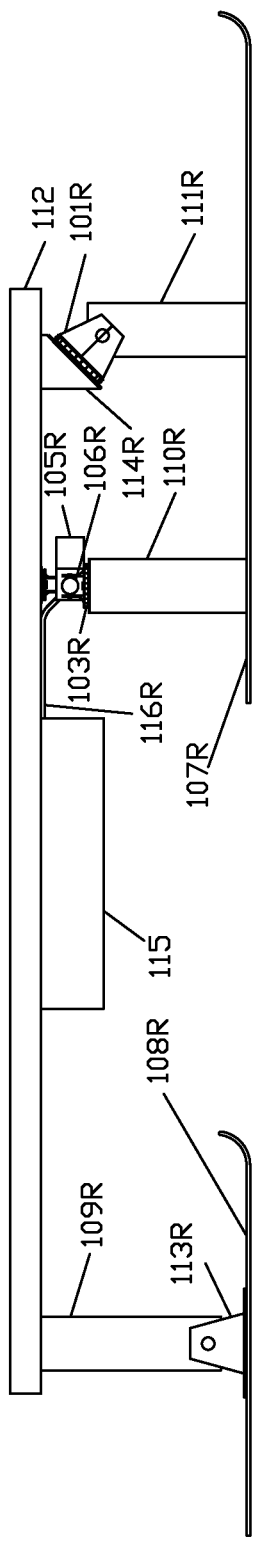
FIG. 3 illustrates a right side elevation view of the exemplary vehicle of FIG. 1
Figure 4:
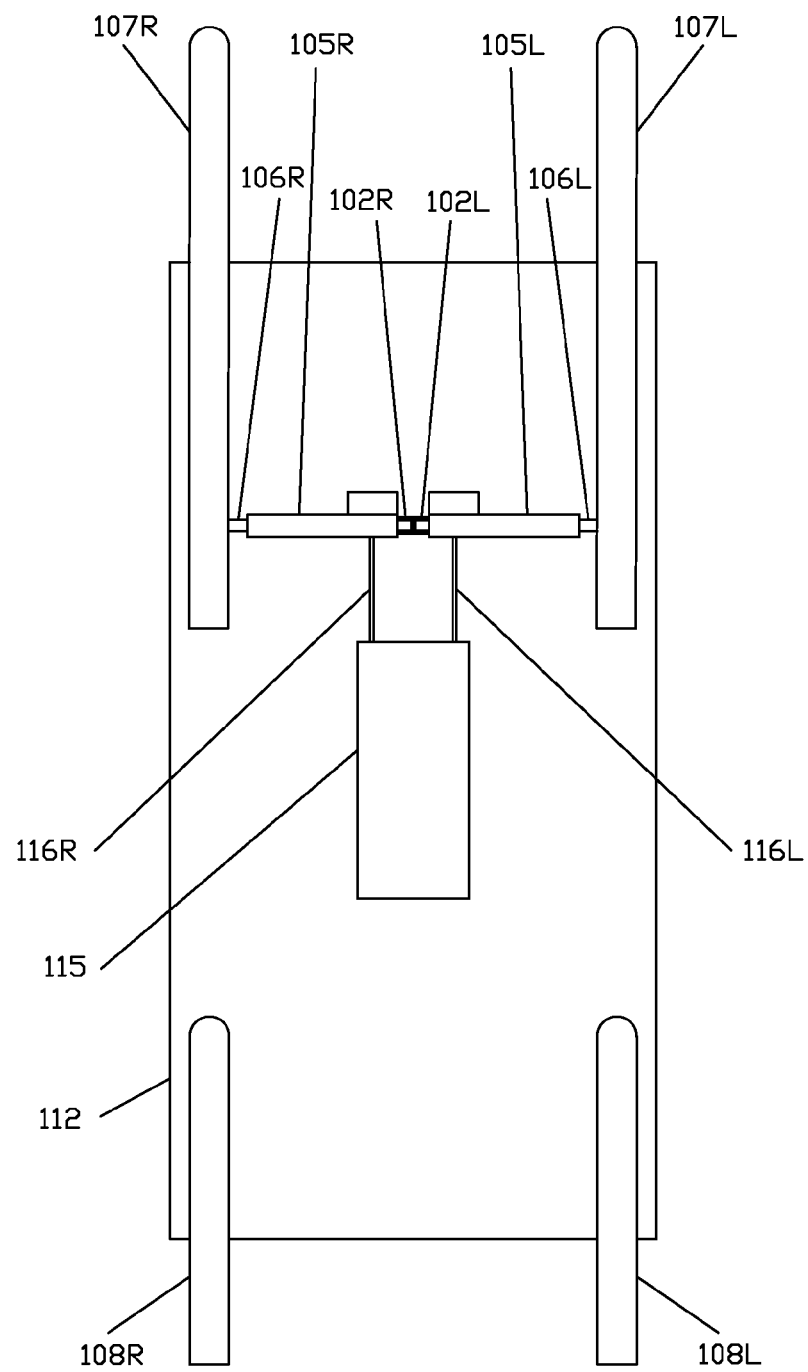
FIG. 4 illustrates a bottom view of the exemplary vehicle of FIG. 1
Figure 12:
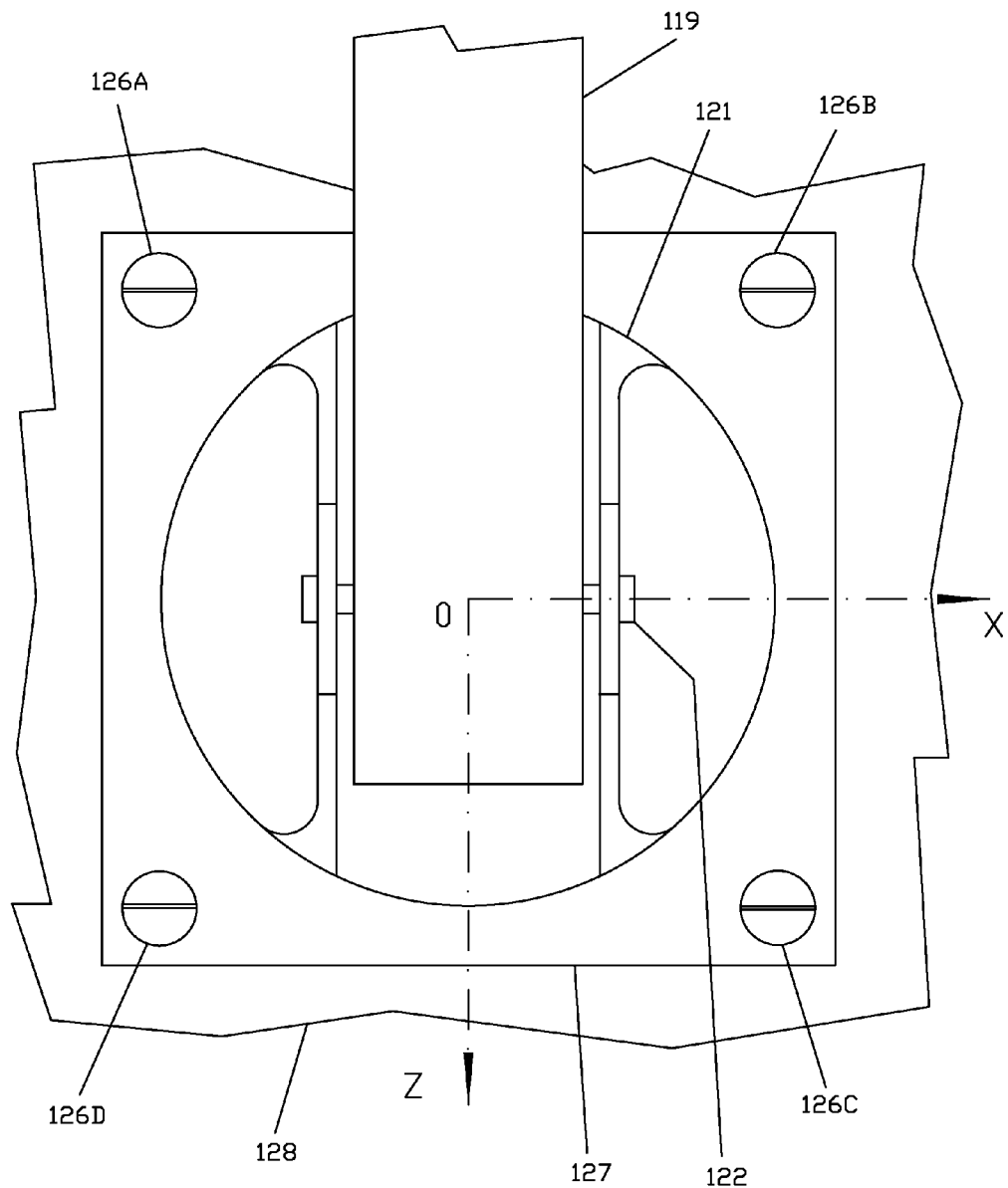
FIG. 12 illustrates a top plan view of the exemplary hinge of FIG. 10
Figure 13:
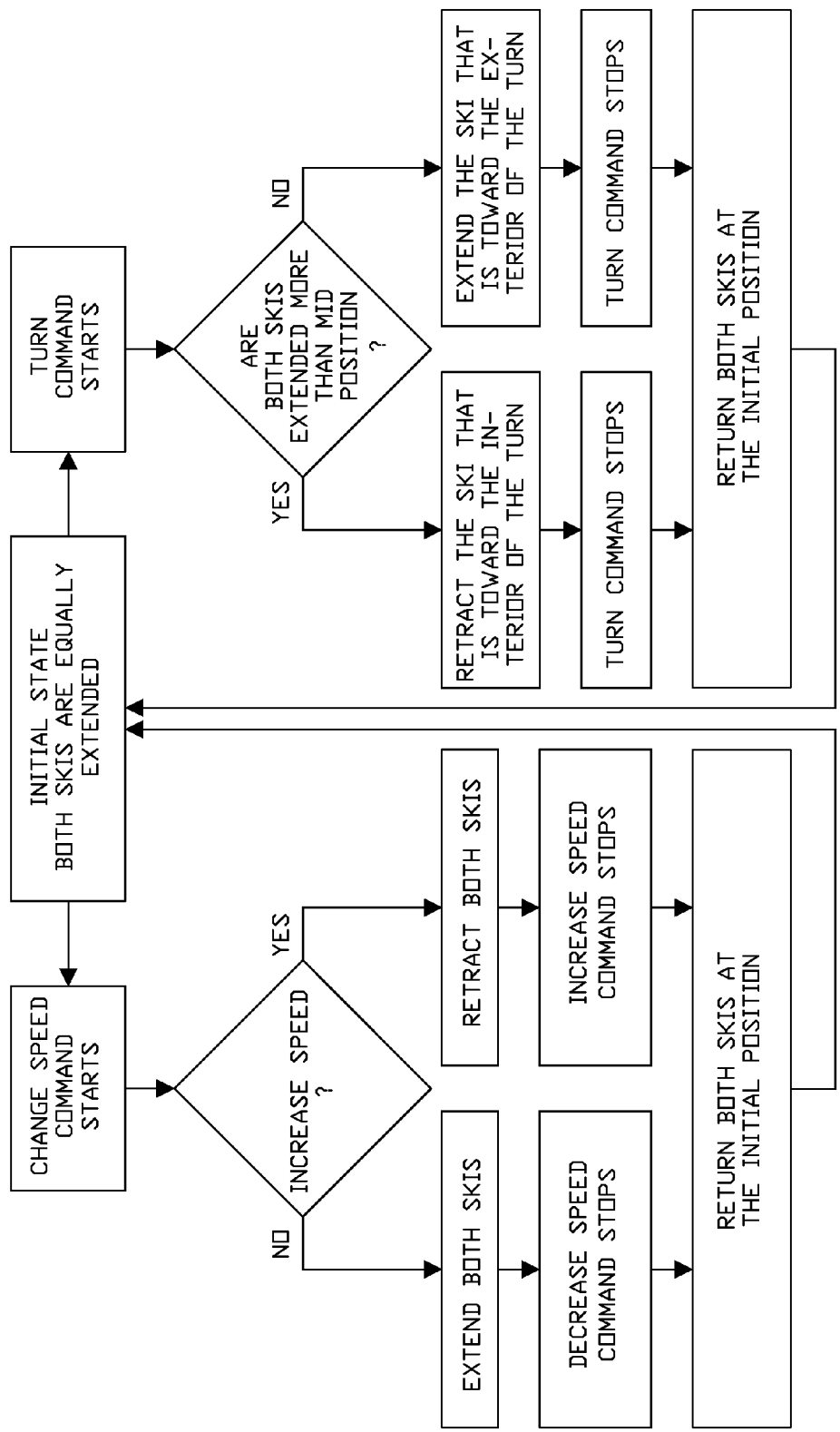
FIG. 13 illustrates an exemplary flow chart of the steering/braking control system of the exemplary vehicle of FIG. 1
Figure 14:
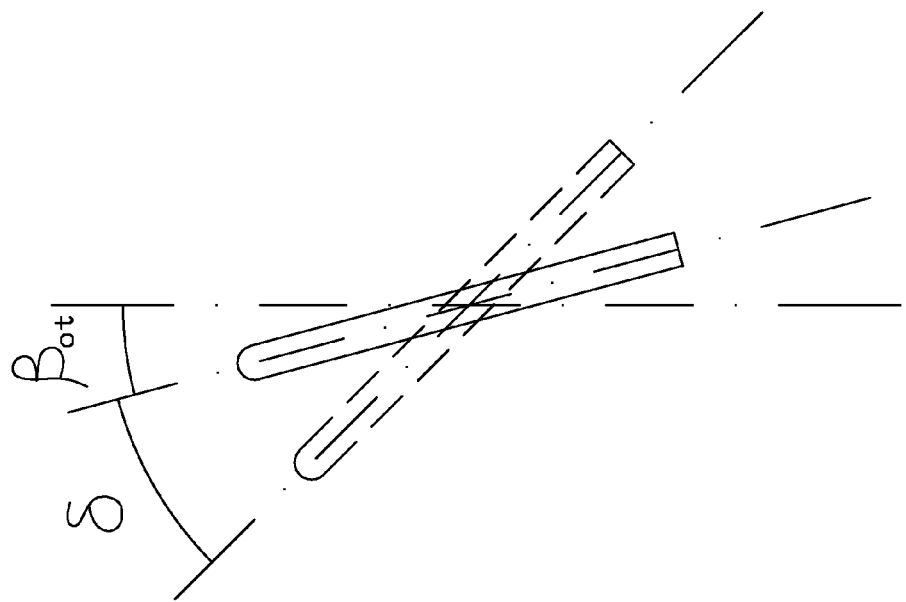
FIG. 14 illustrates a top plan view of the front skis of the exemplary vehicle of FIG. 1 executing a left turn when the skis are initially turned less than half way
Figure 14:
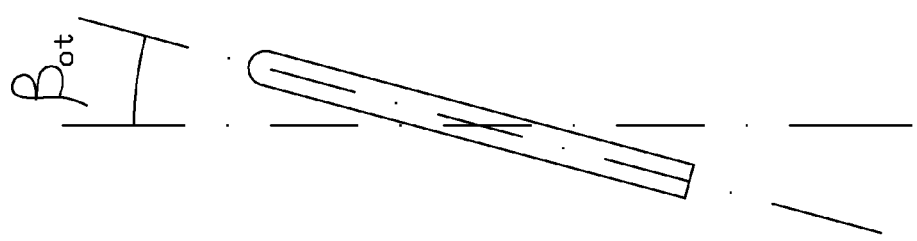

Referring to FIG. 2 and FIG. 3, vehicle 100 includes a frame 112 which is generally attached to the ground engaging members 107L, 107R, 108L and 198R by the posts 111L, 111R, 109L and 109R. Posts 111L and 111R are coupled to the prismatic blocks 114L and 114R using hinges 101L and 101R. Blocks 114L and 114R are rigidly attached to the frame 112 and the face of the blocks 114L and 114R on which the hinges 101L and 101R are mounted has a 45 degree angle relative to the plane of the frame 112. The hinges 101L and 101R permit rotation and tilting of the posts 111L and 111R relative to the frame 112. Since the left side is the mirror image of the hinge 101R, only the hinge 101R will be discussed. The hinge 101R permits the rotation of the post 110R about a first axis that is perpendicular to the face of the prismatic block 114R on which the hinge 101R is mounted and simultaneously and independently permits rotation of the post 110R about another axis that is perpendicular to the first axis. An embodiment of such a hinge is illustrated in FIG. 12, FIG. 13 and FIG. 14. The posts 110R and 111R are rigidly attached to the ski 7R. The post 110R is attached at the other end to the moving rod 106R of the actuator 105R using a hinge 103R that is similar to the one illustrated in FIG. 10-12. The body of the actuator 105R is attached to the frame 112 using a hinge 102R that is similar to the one illustrated in FIG. 10-12. This arrangement permits the front skis to follow the uneven snow surface while maintaining as much contact with the snow as possible. In this embodiment of the vehicle 100, the actuators 105L and 105R are linear electric motors controlled by the electronics control unit 115, which is mounted under the frame 112 and is connected to the actuators 105L and 105R using cables 116L and 116R respectively.

In one embodiment, the rear ground engaging members are the skis 108L and 108R which are attached to the posts 109L and 109R using hinges 113L and 113R. The posts 109L and 109R are rigidly attached to the frame 112. The hinges 113 L and 113R permit the rotation of the skis 108L and 108R about an axis parallel to the frame 112 and perpendicular to the longitudinal axis of the frame 112. This arrangement permits the rear skis to follow the uneven snow surface while maintaining as much contact with the snow as possible. The vehicle is gravity propelled.

In another embodiment, the rear ground engaging member is an endless track operatively coupled to a power train system supported by the frame 112.

Figure 5:
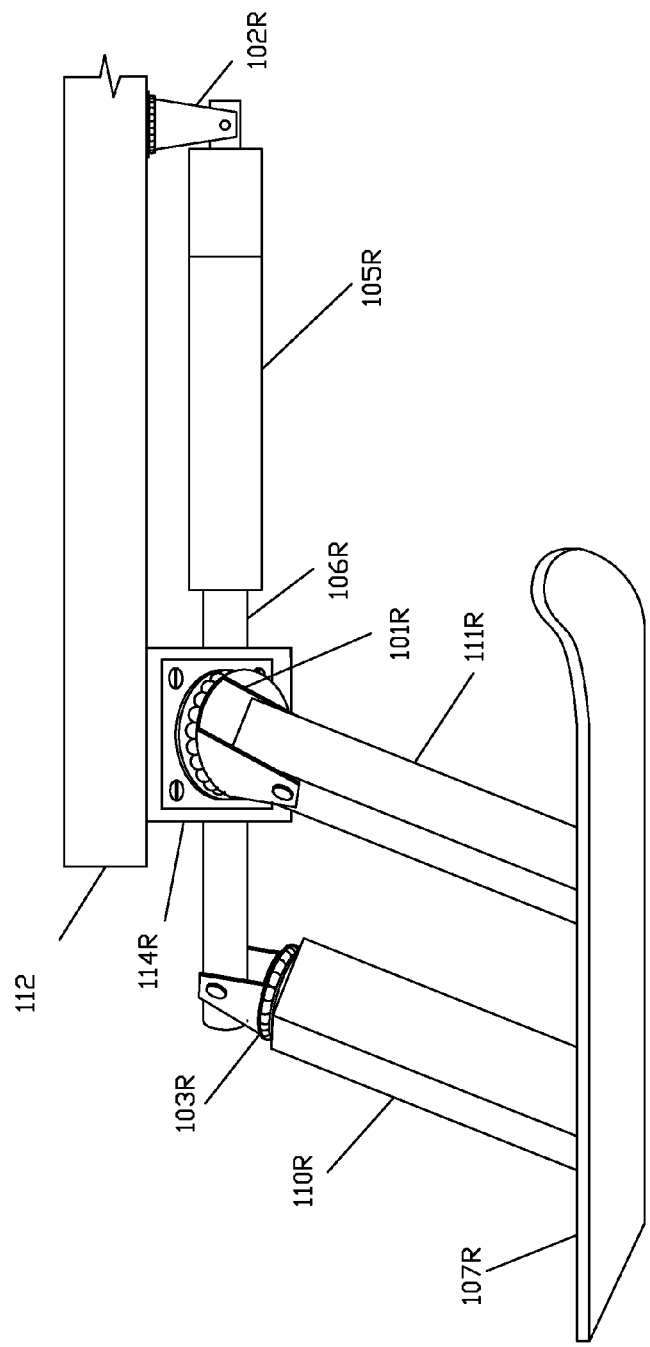
FIG. 5 illustrates a front elevation view of the right front ski of the exemplary vehicle of FIG. 1 in the turning/braking position

Referring to FIG. 5, the front right ski 107R is illustrated in the turning/braking position. The actuator 105R extends the rod 106R that pushes the post 110R toward the exterior of the vehicle, thus moving the rear end of the front ski 107R toward the exterior of the vehicle. The result is that the front ski 107R is not only rotated with an angle α from the straight position, but is also tilted about the snow surface with an angle α/2 due to the fact that the hinge 101R is mounted on the face of the prismatic block 114R that is built to have a 45 degrees angle about the plane of the frame 112. This tilting of the ski 107R ensures that the ski is making contact with the snow mainly on the edge, in the manner used by a skier turning or braking with the plow technique.

Figure 6:
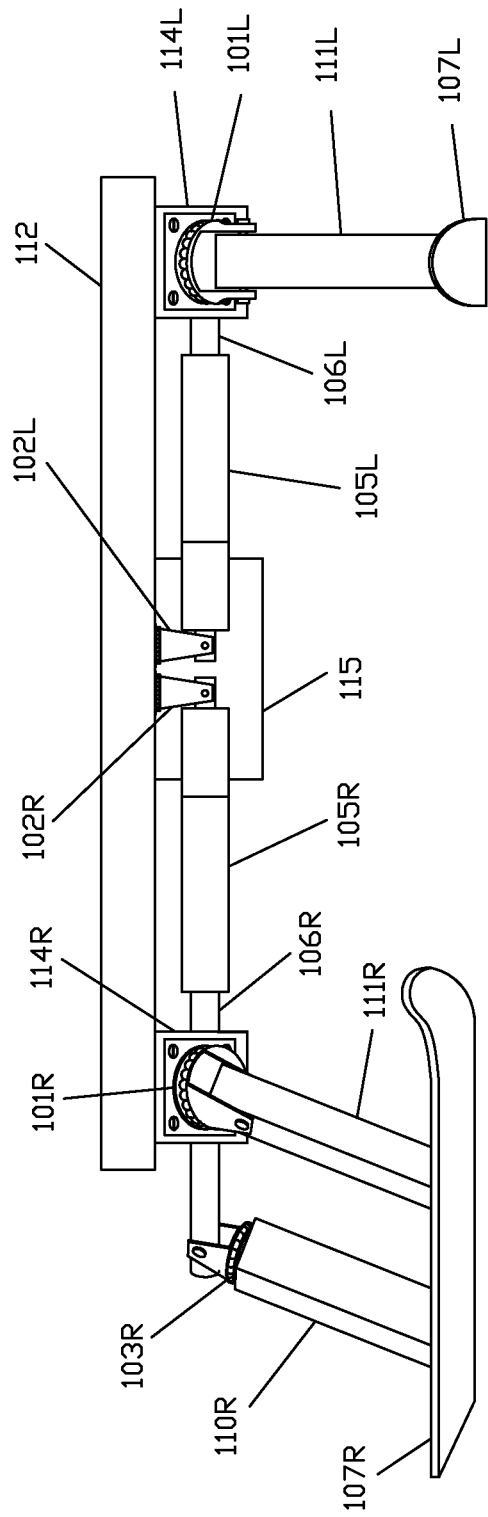
FIG. 6 illustrates a front view elevation of the front skis of the exemplary vehicle of FIG. 1 in the left turning position (rear skis not shown)

Referring to FIG. 6, a front view of the snow vehicle 100 making a left turn is illustrated. For clarity, only the front skis are shown. Beside the fact that posts are elevating the frame from the snow, another advantage of mounting the front skis 107R and 107L on posts 110R, 111R and 110L, 111L is that when turning or braking, the skis that are rotated are also pushed toward the exterior of the body of vehicle 100, increasing the efficiency of the turning or braking manoeuver.

Figure 7:
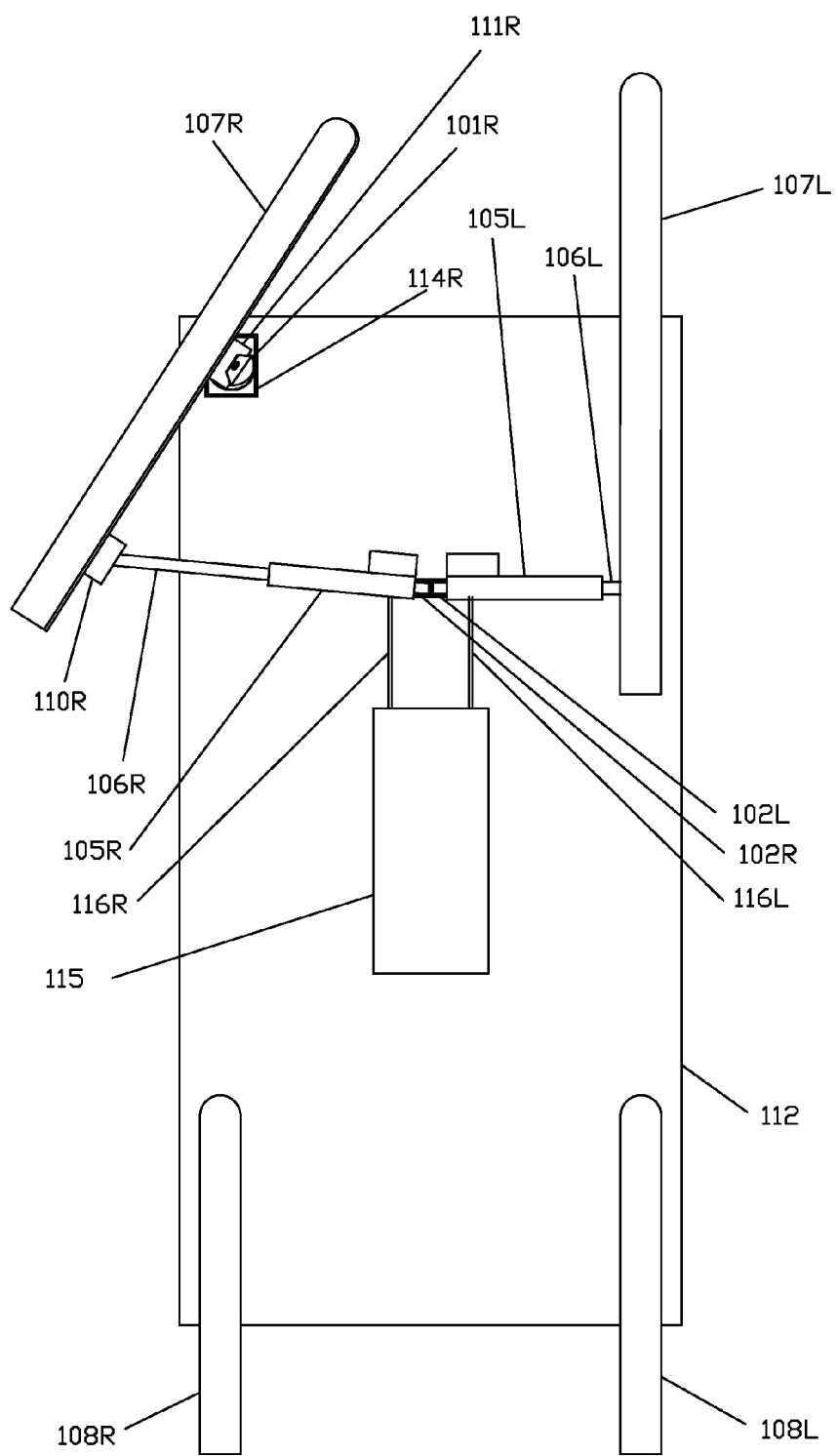
FIG. 7 illustrates a bottom view of the exemplary vehicle of FIG. 1 in the left turning position

A bottom view of the snow vehicle 100 making a left turn is illustrated in FIG. 7.

Figure 8:
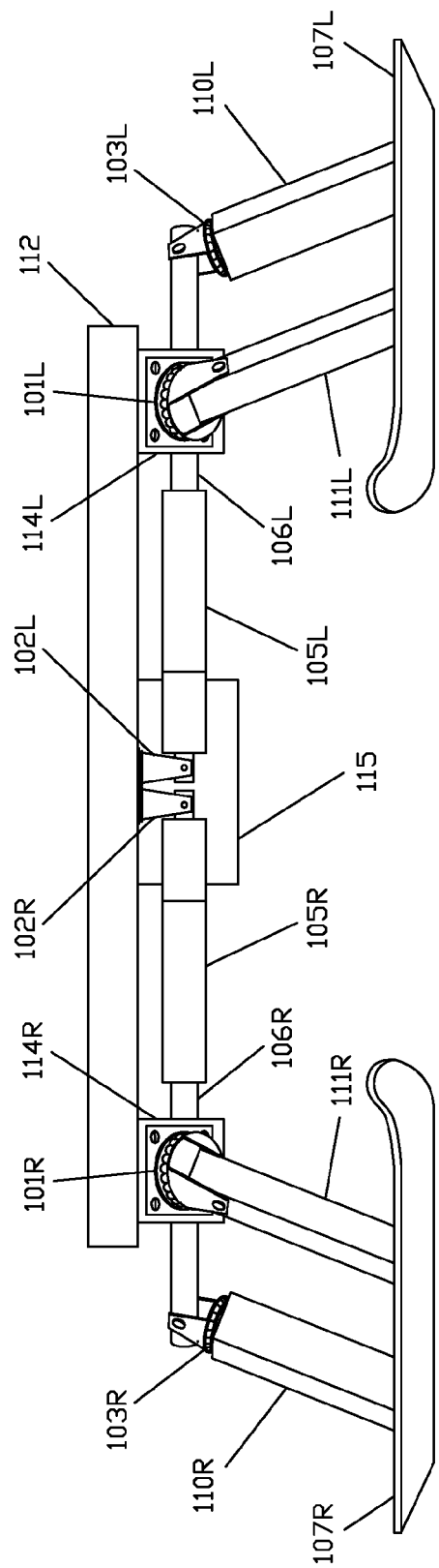
FIG. 8 illustrates a front elevation view of the front skis of the exemplary vehicle of FIG. 1 in the braking position (rear skis not shown)

A front view of the snow vehicle 100 braking is illustrated in FIG. 8. For clarity, only the front skis are shown.

Figure 9:
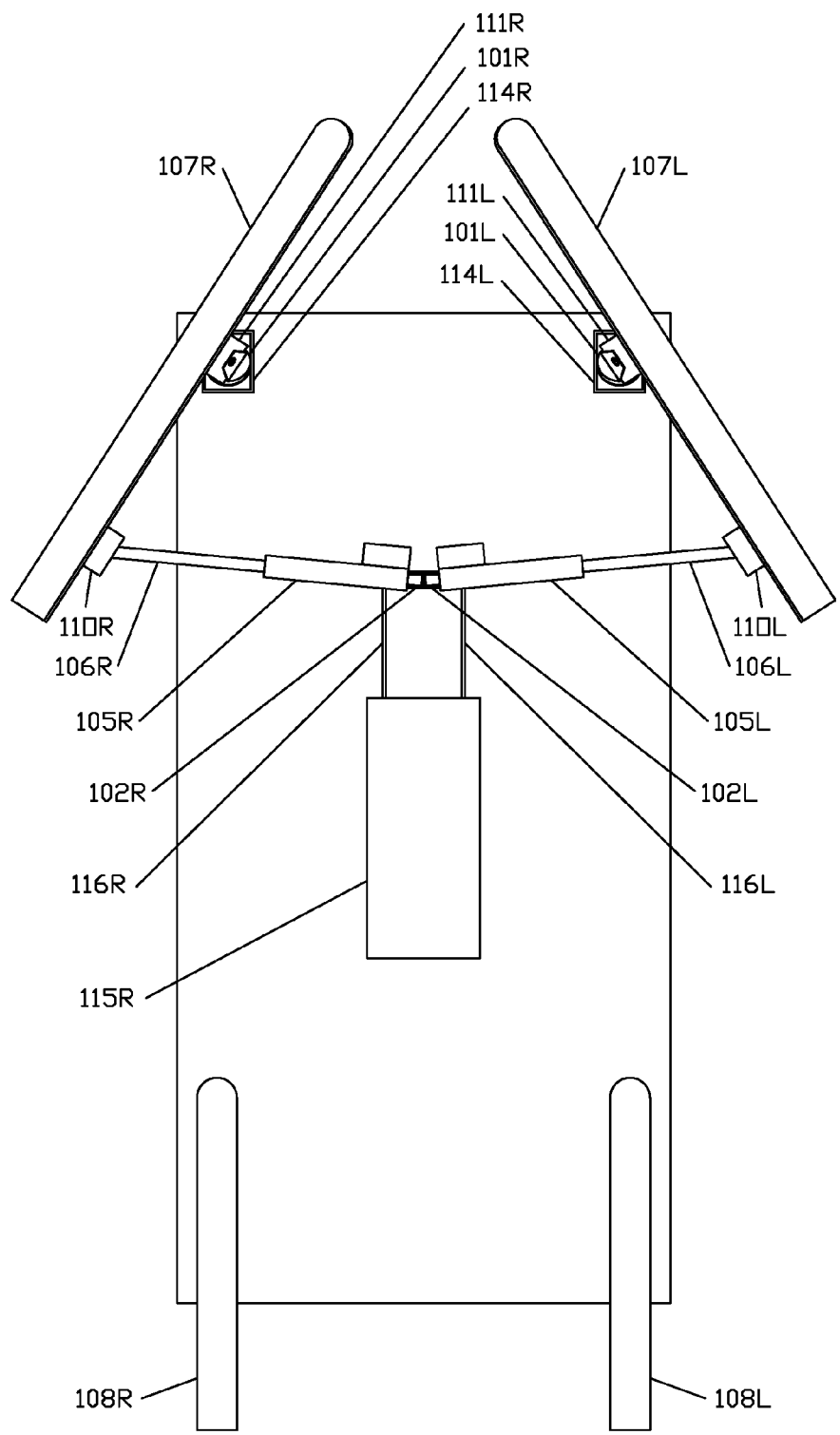
FIG. 9 illustrates a bottom view of the exemplary vehicle of FIG. 1 in the braking position

A bottom view of the snow vehicle 100 braking is illustrated in FIG. 9.

Figure 10:
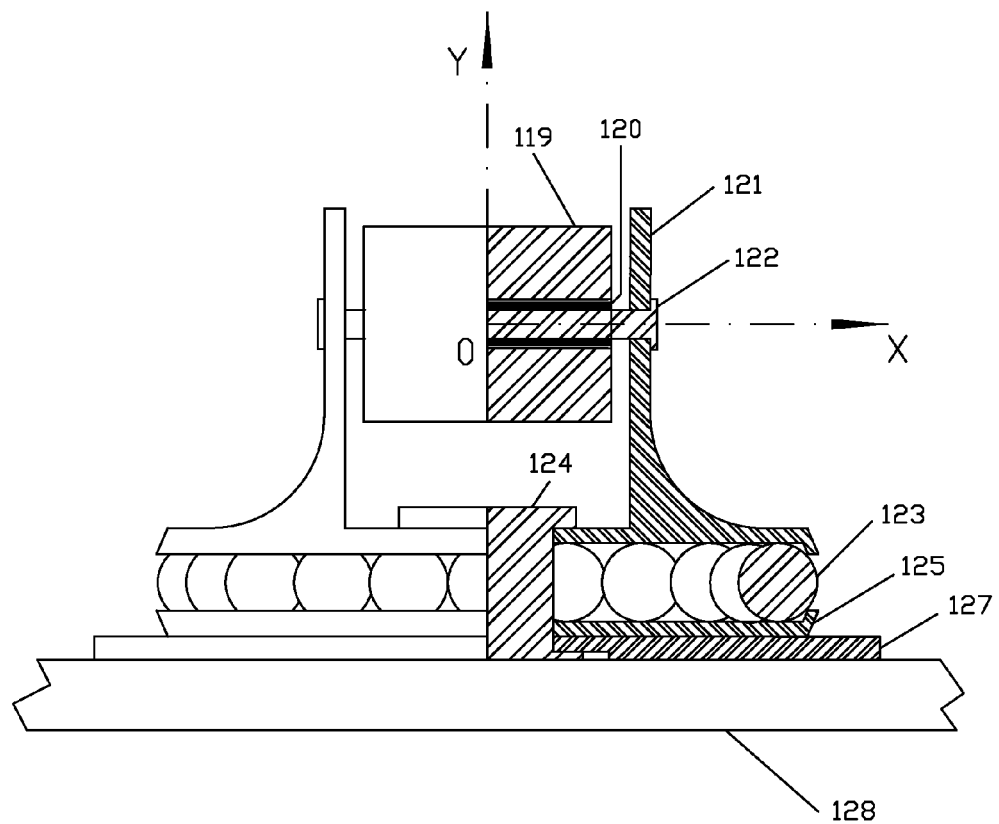
FIG. 10 illustrates a front elevation/section view of an exemplary two degrees of freedom (DOF) hinge

Referring to FIG. 10, a semi-section front view of an embodiment of a two degrees of freedom (DOF) hinge like the one used for hinges 101L, 101R, 102L, 102R, 103L and 103R is presented. The ball bearings 123 permit the bracket 121 to pivot about the axis of the bolt 124. The second object 119 is connected to the hinge with the pin 122 that passes through holes in the bracket 121 and second object 119. The second object 119 can pivot about the axis of the pin 122. The sleeve 120 is made of bronze and will insure a smooth rotation of the second object 119 about pin 122. This type of hinge will offer second object 119 two DOF of movement about the first object 128: rotation about first axis OY that is perpendicular to the mounting surface of the first object 128 and rotation about second axis OX that is perpendicular to the first axis. Specifically, for the hinge 101, the first object 128 is the face of the block 114 that is angled at 45 degrees with respect to the frame 112 and the second object 119 is the post 111; for the hinge 102, the first object 128 is the frame 112 and the second object 119 is the body of the actuator 105; for the hinge 103, the first object 128 is the end of the post 110 and the second object 119 is the rod 106 of the actuator 105.

Figure 11:
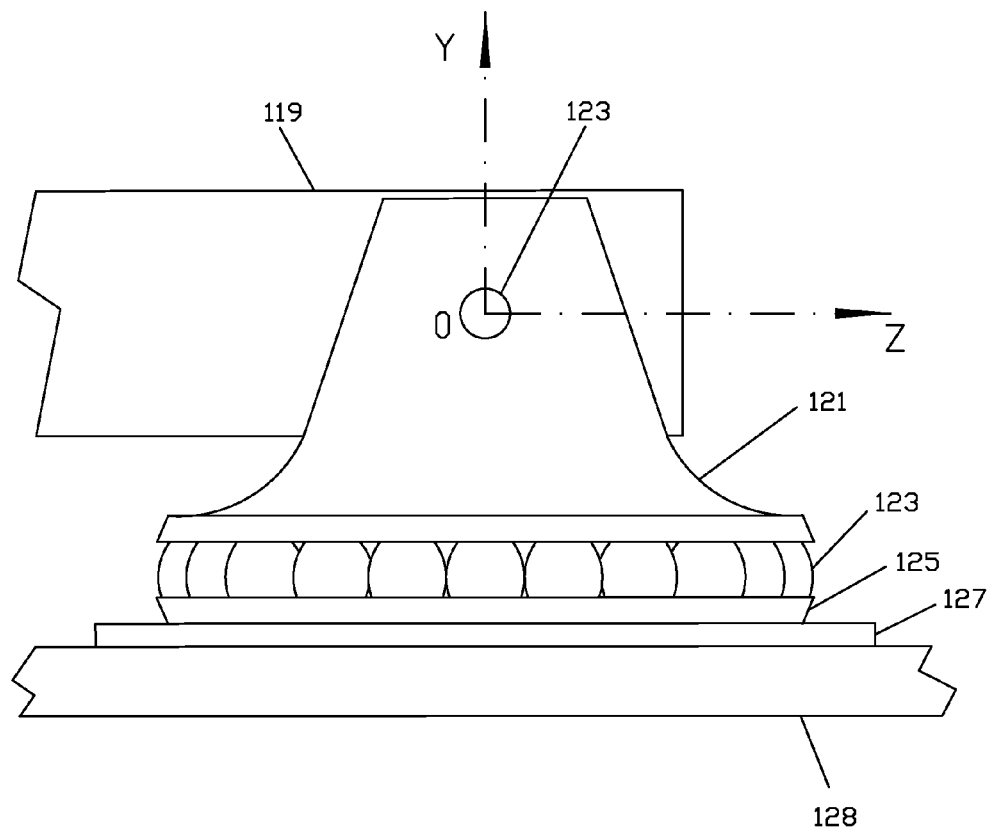
FIG. 11 illustrates a left side elevation view of the exemplary hinge of FIG. 10

Referring to FIG. 11, a lateral view of the two DOF hinge from FIG. 10 is presented.

Referring to FIG. 12, a top view of the two DOF hinge from FIG. 10 is presented. The base 127 is attached to the mounting surface of first object 128 with screws 126A, 126B, 126C and 126D.

Referring to FIG. 13, an exemplary flow chart of a steering/braking control system is presented. The steering/braking controller receives directional instructions from a human interface device such as a joystick. The exemplary steering/braking controller uses a proportional approach in translating the simple and proportional movements of the joystick (forward, backward, left, right) to proportional and coordinated movements of the skis so that the snow vehicle will move forward (no brake), brake, turn left, turn right. The exemplary steering/braking controller utilizes a finite state machine, with a default state in which both front skis remain motionless and at the same relative extension position for the actuators. This state is stored in a collective position variable. Upon reception of a turn command, the state machine enters a turn state using proportional control. If the collective leg position variable was closer to the full retraction of the actuators, the robot entered the extension turn state. The robot turned by extending the actuator for the outside leg in accordance with the following equation:

$$\beta_{ot} = \beta_{os} + \delta$$

where:
$\beta_{ot}$ is the outside leg's turning angle,
$\beta_{os}$ is the collective leg position angle and
$\delta$ is the steering increment.

The steering increment angle $\delta$ is proportional with the magnitude of the joystick's movement. A top view of the front skis of the exemplary vehicle of FIG. 1 executing a left turn when the skis are initially turned less than half way is illustrated in FIG. 14.

If the collective leg position variable was closer to the full extension of the actuators, the robot entered the ski retraction turn state. The robot turned by retracting the actuator for the inside leg in accordance with the following equation:

$$\beta_{it} = \beta_{is} - \delta$$

where:
$\beta_{it}$ is the inside leg's turning angle,
$\beta_{is}$ is the collective leg position angle and
$\delta$ is the steering increment.

Figure 15:
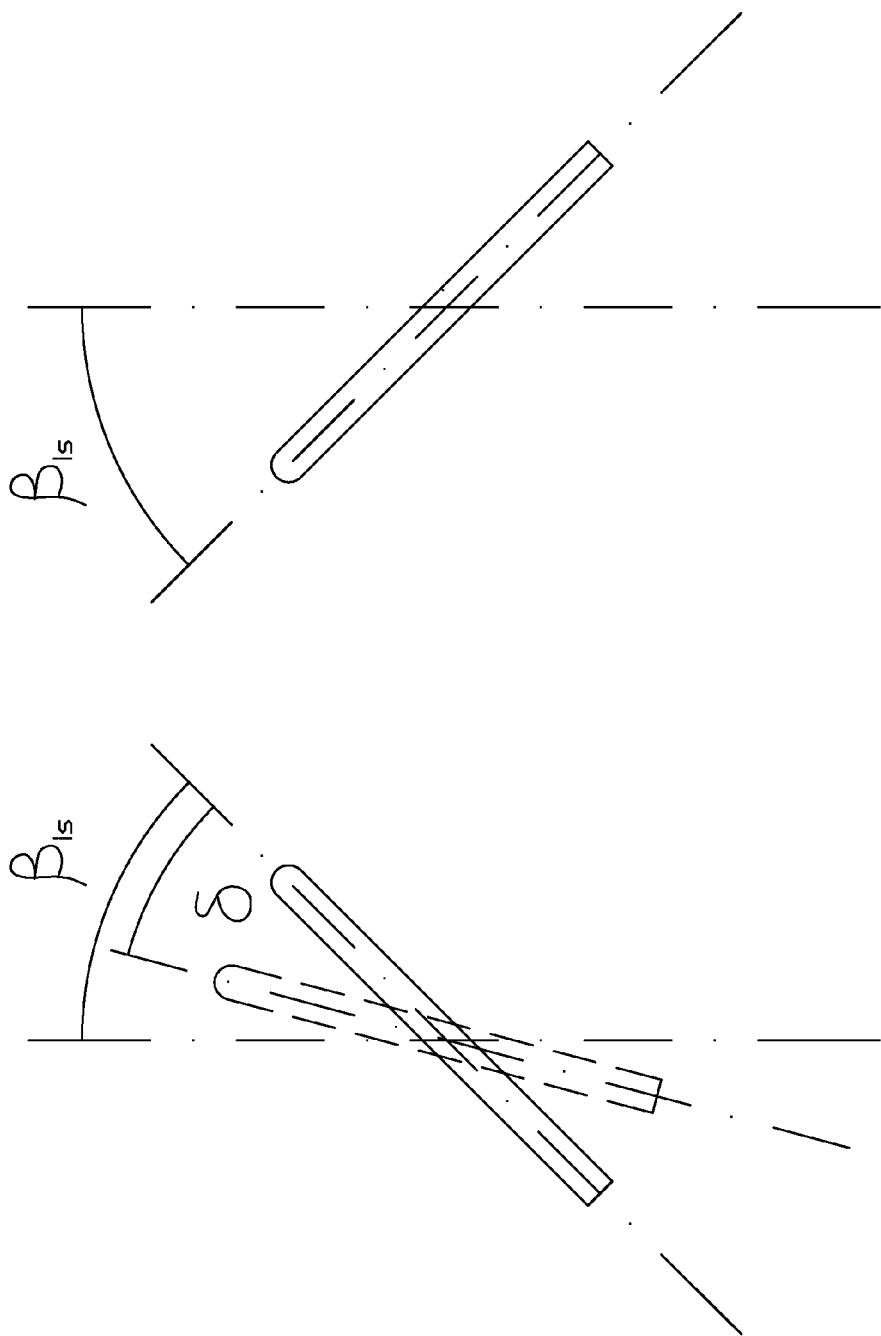
FIG. 15 illustrates a top plan view of the front skis of the exemplary vehicle of FIG. 1 executing a left turn when the skis are initially turned more than half way

The steering increment angle $\delta$ is proportional with the magnitude of the joystick's movement. A top view of the front skis of the exemplary vehicle of FIG. 1 executing a left turn when the skis are initially turned more than half way is illustrated in FIG. 15. Using two different turn states ensured that during a turn, the skis could execute turning motions fully, guaranteeing that the robot would turn as desired. Once the turning command was discontinued, the state machine would return to the neutral state, and the skis would return to the previously established collective leg position.

If a speed increase command was received, the robot switched to differential control, and the collective leg position variable was decreased, bringing in tandem both skis closer to parallel position by retracting both actuators. The change was determined by the following equation:

$$\beta_f = \beta_i - \delta$$

where:
$\beta_f$ is the new collective leg position,
$\beta_i$ is the old collective leg position and
$\delta$ is the position change increment.

Figure 16:
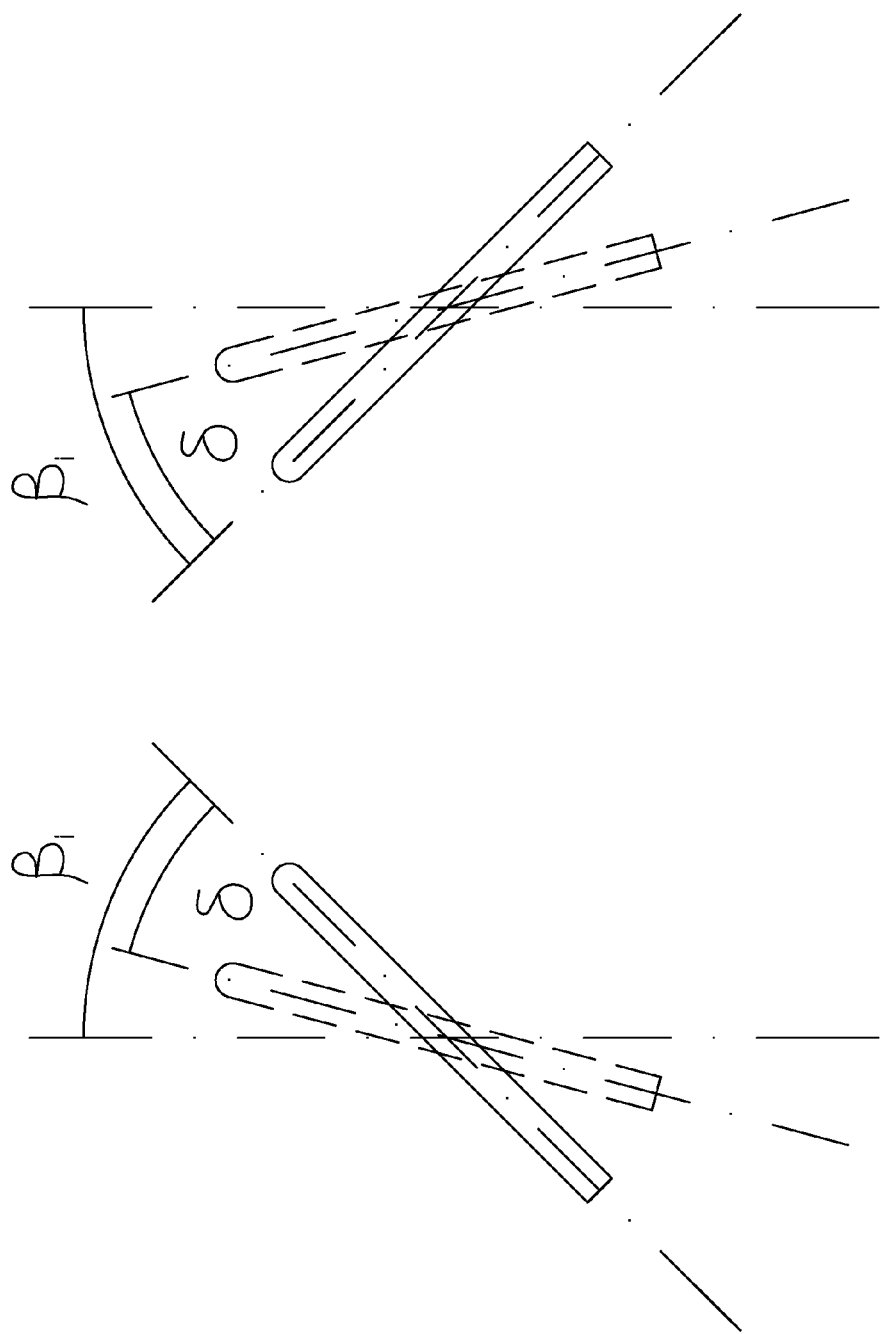
FIG. 16 illustrates a top plan view of the front skis of the exemplary vehicle of FIG. 1 executing a speed increase command

The speed increment angle $\delta$ is proportional with the magnitude of the joystick's movement. A top view of the front skis of the exemplary vehicle of FIG. 1 executing a speed increase command is illustrated in FIG. 16.

If a speed decrease command was received, the collective leg position variable was increased, bringing in tandem both skis to form an angle by extending both actuators. The change was determined by the following equation:

$$\beta_f = \beta_i + \delta$$

where:
$\beta_f$ is the new collective leg position,
$\beta_i$ is the old collective leg position and
$\delta$ is the position change increment.

Figure 17:
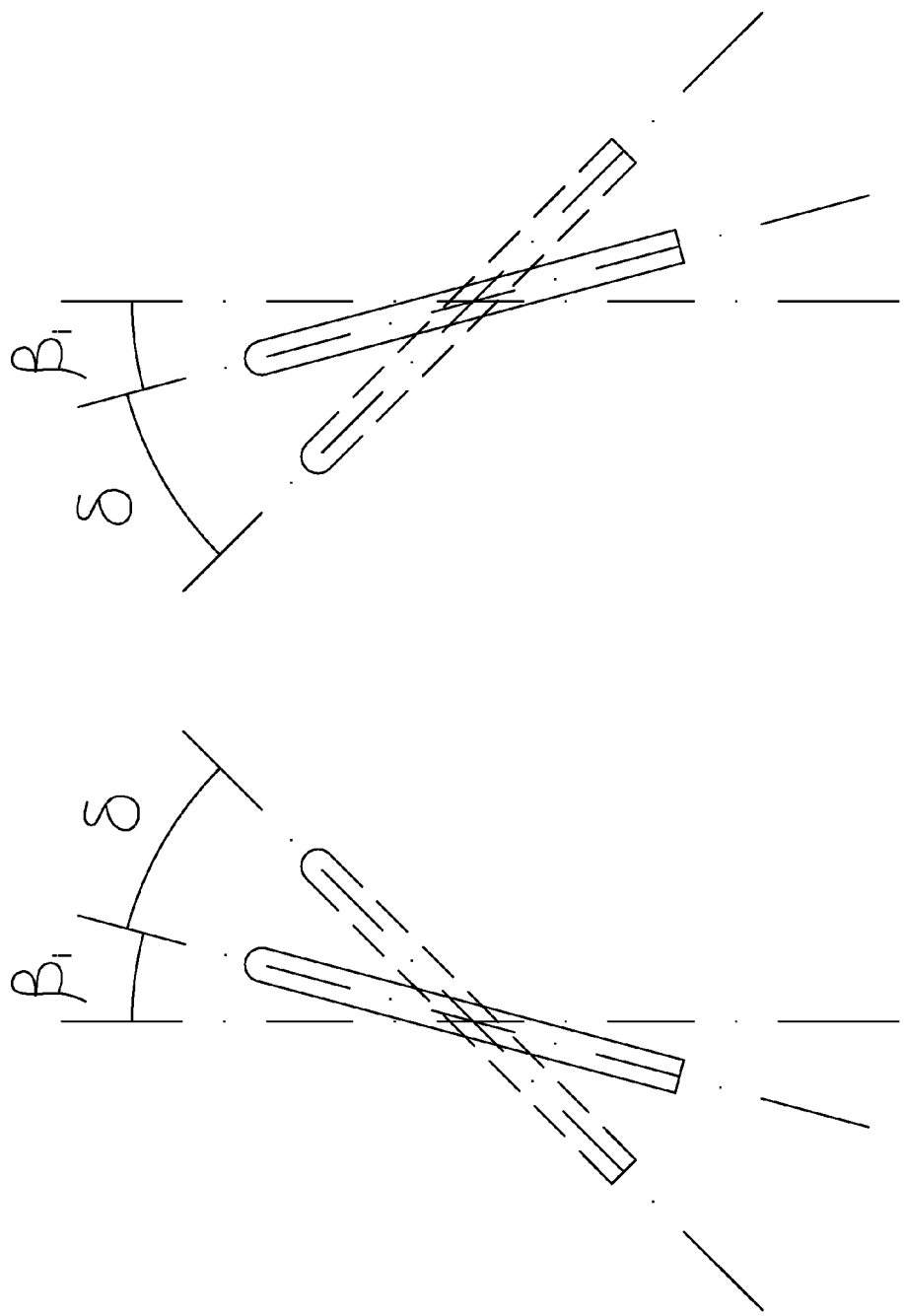
FIG. 17 illustrates a top plan view of the front skis of the exemplary vehicle of FIG. 1 executing a speed decrease (brake) command

The speed decrease angle $\delta$ is proportional with the magnitude of the joystick's movement. A top view of the front skis of the exemplary vehicle of FIG. 1 executing a speed increase command is illustrated in FIG. 17. If the skis were at a maximum extension or retraction of the actuators, commands to continue extension or retraction of the actuators will not further change the current position of the actuators.

An exemplary implementation of the steering/braking control system used a Phidgets brand high current two channel motor controller to control the two electric linear motors (actuators) made by Servo City (Winfield Kans.). The motors were powered by a high power 12V DC battery. The rods of the two linear actuators were mechanically attached to potentiometers. The positional information from the potentiometers was read by a Phidgets brand analog interface kit and transformed into an electric signal. The Phidgets brand motor controller, interface kit and a wireless joystick were connected via USB ports to a Dell laptop computer running Windows XP. The software program to control the steering/braking of the snow vehicle is written in Pyton. The computer listing of the program is provided as a text only file: Vehicle_Control_Software.txt.

What is claimed:
1. As snow vehicle comprising:
   a frame that is supported by a plurality of ground engaging members, including two front ground engaging members and two rear ground engaging members;
   a plurality of posts, including two front and two rear posts, with the rear posts rigidly attached to the frame and also attached to the rear ground engaging members using a one degree of liberty hinge and with the two front posts rigidly attached to the two front ground engaging members and also attached to the frame using a two degree of liberty hinge and a prismatic block;
   a two degree of liberty type of hinge used to connect the two posts rigidly attached to the front ground engaging members to the frame using a prismatic block which has two faces angled at 45 degrees and is installed such as the two front ground engaging members are rotatable relative to the frame about a first set of axes that are parallel to each other and angled back at 45 degrees relative to the frame and are also rotatable relative to a second set of axes that are perpendicular to the first set of axes;
   a steering/braking assembly consisting of two linear actuators, operatively coupled to the frame and to the rear part of the two front ground engaging members using two posts that are rigidly coupled to the rear part of the front ground engaging members a set of four two degree of liberty hinges used to connect each end of the said linear actuators to the frame and respectively to the two posts that are rigidly coupled to the rear part of the front ground engaging members.

* * * * *